United States Patent Office 3,430,513
Patented Mar. 4, 1969

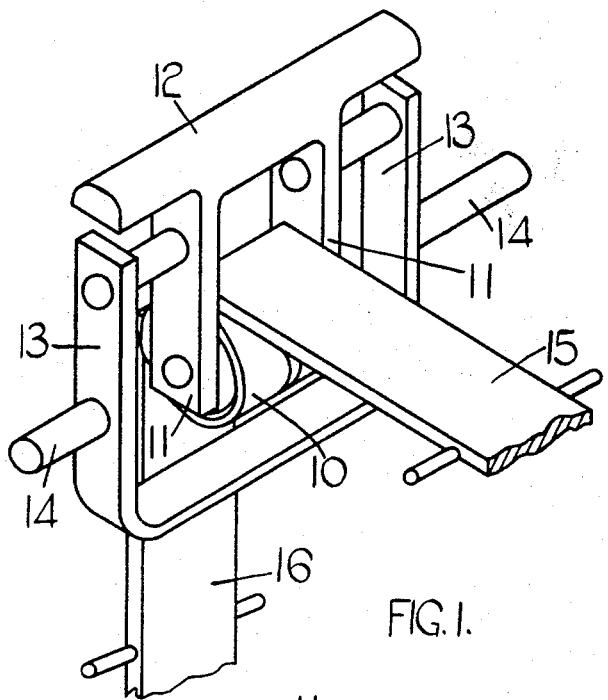
FIG. 1.
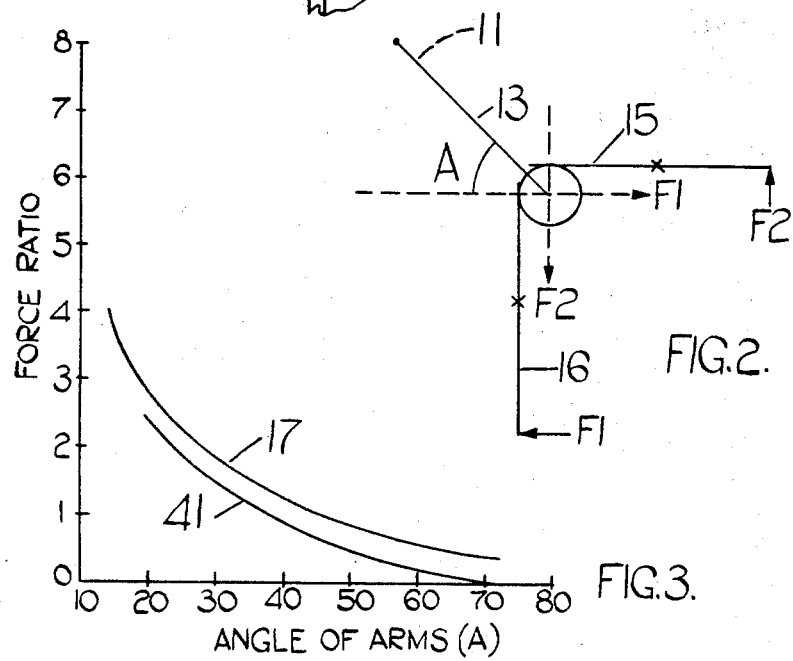
FIG. 2.
FIG. 3.

3,430,513
DEVICES FOR TRANSLATING FORCES
Owen Napier Lawrence, Wimbledon, London, England, assignor to Joseph Lucas (Industries) Limited, Birmingham, England, a British company
Filed July 5, 1967, Ser. No. 651,170
U.S. Cl. 74—519                                                1 Claim
Int. Cl. G05g 1/04

ABSTRACT OF THE DISCLOSURE

A device for translating forces comprising levers acting upon an element so as to transmit forces thereto, the element being mounted upon a fixed body through pairs of arms, one lever having applied thereto a force and in addition a further force which is a proportion of the force applied to other lever.

---

This invention relates to a device for translating forces and of the kind comprising in combination, an element, a pair of pivotally connected arms for mounting said element upon a fixed body, one of said arms being pivotally connected to said element about a first axis which is parallel to but spaced from the common pivot axis of the two arms, and the other arm being pivotally connected to the body about a second axis which is parallel to and is spaced from the common pivot axis by the same distance as the spacing of the first axis from the common pivot axis, the element and arms being movable to a position in which the first and second axes are coincident, in which position the device is said to be in equilibrium, and a pair of levers through which forces can act upon the element, the forces acting upon the element at right angles when the device is in equilibrium.

The object of this invention is to provide such a device in a simple and convenient form.

According to the invention in a device of the kind specified means is provided for applying to one of the levers a further force which is a proportion of the force applied to the other lever.

In the accompanying drawings:

FIGURE 1 is a perspective view of the simple device,

FIGURE 2 is a force diagram of the simple device,

FIGURE 3 is a graph bearing two curves showing the relationship between force ratio and the angle of the arms for the simple device and the device in accordance with the invention.

Figure 4:
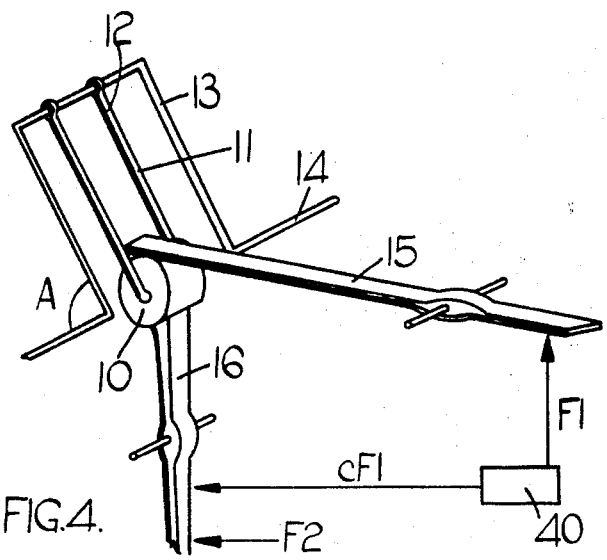
FIGURE 4 is a diagrammatic layout of the device in accordance with the invention.

With reference to FIGURES 1, 2 and 3 of the drawings the simple device comprises a roller 10 which is pivotally mounted about a first pivot axis upon a first arm in the form of spaced and interconnected limbs 11 which at their ends remote from the roller are provided with a balance weight 12. The first arm is pivotally connected to a second arm comprising a pair of spaced limbs 13, the common pivot axis of the arms being parallel to but spaced from, the pivot axis of the roller and the first arm. The second arm is pivotally mounted about a second pivot axis upon a fixed body (not shown) by means of a pair of axles 14 which extend from the limbs 13 respectively. The second pivot axis is parallel to and spaced from the common pivot axis by a distance equal to the spacing of the first pivot axis from the common pivot axis.

Also provided is a pair of levers 15, 16 which are pivotally mounted intermediate their ends upon the aforesaid body. The levers are disposed at 90° relative to each other and the adjacent ends of the levers bear upon the roller 10. Forces applied to the remote ends of the levers will be transmitted to the roller and will act thereon at right angles relative to each other. If the two forces are equal the mechanism by rotation of the axle, can be made to assume a position of equilibrium in which the angle of the arms (indicated at A in FIGURE 2) is 45°. Moreover, in the equilibrium position the first and second axes are coincident with each other.

If the two forces applied to the roller are not equal the roller will be displaced and the arms must be adjusted by angular movement of the axles to bring the device back into the equilibrium position. Thus the angle A of the arms at the equilibrium position is an indication of the ratio of the forces applied to the roller. If the angle A is plotted against the ratio of the forces in the form $1/K \cdot F_2/F_1$ then curve 17 is obtained in FIGURE 3. It has been found that the device is usable only between arm angles of 20° and 70°. The range of force ratios is approximately 7.5:1, the 20° position corresponding to a force ratio of 2.75 and the 70° position to a force ratio of 0.36.

The device above described can be modified to provide an extended range of force ratios. In addition a force ratio (as previously defined) of zero can be measured.

The device is modified by the addition of means indicated at 40 which applies to the lever 16 in addition to the force $F_2$ a fixed proportion of the force $F_1$ which is applied to the lever 15. If the angle of the arms is now plotted against the force ratio (as previously defined), the curve 41 is obtained and at the 70° position the force ratio is zero whilst at the 20° position the force ratio is 2.4. The range of force ratios measurable is therefore considerably increased and it will be appreciated that by suitable choice of the constants within the system, any required range can be obtained.

Figure 5:
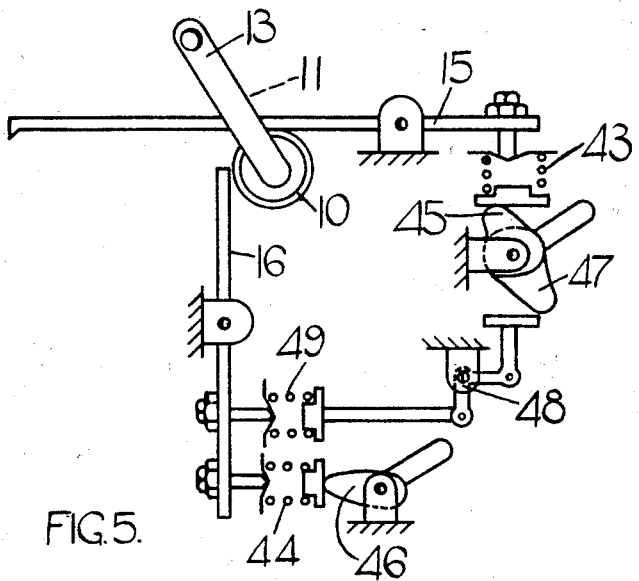
FIGURE 5 is a side elevation of a practical form of the device shown in FIGURE 4.

A practical form of the device is shown in FIGURE 5 in which the force $F_1$ is applied to the lever 15 through a coiled compression spring 43 and the force $F_2$ applied to the lever 16 through a coiled compression spring 44. The springs at their ends remote from the levers bear upon angularly movable cams 45 and 46 respectively. The cam 45 has associated therewith a further cam 47 and this bears upon an abutment which through a bell crank lever 48 and a coiled compression spring 49 imposes a force on the lever 16 which by suitable choice of the lever ratio can be made to be equal to any proportion of the force $F_1$.

Having thus described my invention what I claim as new and desire to secure by Letters Patent is:

1. A device for translating forces and of the kind comprising in combination, an element, a pair of pivotally connected arms for mounting said element upon a fixed body, one of said arms being pivotally connected to said element about a first axis which is parallel to but spaced from the common pivot axis of the two arms, and the other arm being pivotally connected to the body about a second axis which is parallel to and is spaced from the common pivot axis by the same distance, as the spacing of the first axis from the common pivot axis, the element and arms being movable to a position in which the first and second axes are coincident in which position the device is said to be in equilibrium, and a pair of levers through which forces can act upon the element, the forces acting upon the element at right angles when the device is in equilibrium, and means for applying to one of the levers a further force which is a proportion of the force applied to the other lever.

References Cited

UNITED STATES PATENTS

| | | | |
|---|---|---|---|
| 1,498,099 | 6/1924 | Howland-Shearman | 74—519 X |
| 2,940,332 | 6/1960 | Teague | 74—516 X |
| 3,327,552 | 6/1967 | Broders et al. | |

MILTON KAUFMAN, *Primary Examiner.*

U.S. Cl. X.R.

74—518